United States Patent [19]
Lehner

[11] Patent Number: 5,934,746
[45] Date of Patent: Aug. 10, 1999

[54] FLOOR STRUCTURE FOR A SELF-SUPPORTING MOTOR-VEHICLE BODY AND METHOD OF MAKING SAME

[75] Inventor: Josef Lehner, Böblingen, Germany

[73] Assignee: Daimler-Benz AG, Stuttgart, Germany

[21] Appl. No.: 09/013,308

[22] Filed: Jan. 26, 1998

[30] Foreign Application Priority Data

Jan. 25, 1997 [DE] Germany .......................... 197 02 669

[51] Int. Cl.⁶ ............................................... B62D 25/20
[52] U.S. Cl. ............................ 296/204; 296/30; 296/189
[58] Field of Search .............................. 296/29, 30, 188, 296/189, 204

[56] References Cited

U.S. PATENT DOCUMENTS

| | | | |
|---|---|---|---|
| 4,514,008 | 4/1985 | Watanabe et al. | 296/204 |
| 4,898,419 | 2/1990 | Kenmochi et al. | |
| 5,102,187 | 4/1992 | Harasaki | 296/204 |
| 5,127,704 | 7/1992 | Komatsu | 296/204 |
| 5,611,593 | 3/1997 | Fukagawa et al. | 296/204 |
| 5,806,918 | 9/1998 | Kanazawa | 296/204 |

FOREIGN PATENT DOCUMENTS

| | | |
|---|---|---|
| 2358356 | 5/1974 | Germany . |
| 2435545A1 | 2/1976 | Germany . |
| 2435545B2 | 2/1976 | Germany . |
| 3301708A1 | 8/1984 | Germany . |
| 4233832A1 | 4/1993 | Germany . |
| 3809185C2 | 8/1994 | Germany . |
| 5-76966 | 10/1993 | Japan . |
| 2034643 | 11/1978 | United Kingdom . |

OTHER PUBLICATIONS

Office Action Sep. 1, 1998 Japan.
Search Report Apr. 3, 1998 Europe.

*Primary Examiner*—D. Glenn Dayoan
*Assistant Examiner*—Chad D. Wells
*Attorney, Agent, or Firm*—Evenson McKeown Edwards & Lenahan, PLLC

[57] ABSTRACT

A floor structure for a self-supporting motor vehicle body is provided which has a down and up open central tunnel and a power unit crossmember extending under the central tunnel. Two mutually opposite supporting profiles are secured in a force-transmitting manner on the power-unit crossmember. Each supporting profile has a dimensionally rigid supporting leg which extends along a lateral tunnel wall of the tunnel arrangement and is arranged parallel to said tunnel wall at a small distance therefrom. In relation to the longitudinal direction of the vehicle the supporting profiles extend at least over part of the length of the power-unit crossmember.

12 Claims, 2 Drawing Sheets

FLOOR STRUCTURE FOR A SELF-SUPPORTING MOTOR-VEHICLE BODY AND METHOD OF MAKING SAME

BACKGROUND AND SUMMARY OF THE INVENTION

This application claims the priority of Germany application 197 02 669.9-42 filed in Germany on Jan. 25, 1997, the disclosure of which is expressly incorporated by reference herein.

The invention relates to a floor structure for a self-supporting motor-vehicle body, having a tunnel arrangement which extends in the longitudinal direction of the vehicle and is intended for receiving power-unit parts, and having a power-unit crossmember which supports individual power-unit parts, extends transversely over the open side of the tunnel arrangement and can be secured relative to the tunnel arrangement with the aid of a plurality of fastening points.

Such a floor structure is known from German Patent Document DE 24 35 545 B2. In the floor structure of the self-supporting motor-vehicle body there is formed, as a duct-like depression, a central tunnel which extends in the longitudinal direction of the vehicle. In the region of transition from the lateral tunnel walls to the horizontal floor structure, the mutually opposite tunnel walls are assigned reinforcement profiles, on which there is secured from beneath a power-unit crossmember for the purpose of supporting a gearbox arrangement comprising power-unit parts. In the event of impact loading on the motor-vehicle body in the transverse direction of the vehicle, the power-unit crossmember, which serves as a gearbox crossmember, can rupture in the region of its fastening points as a result of the high loading which occurs.

An object of the invention is to provide a floor structure of the type mentioned in the introduction which at least largely prevents rupturing of the power-unit crossmember.

This object is achieved according to preferred embodiments of the invention in that two mutually opposite supporting profiles are secured in a force-transmitting manner on the power-unit crossmember and each has a dimensionally rigid supporting leg which extends along a lateral tunnel wall of the tunnel arrangement, is arranged parallel to said tunnel wall, at a small distance therefrom, and—in relation to the longitudinal direction of the vehicle—extends at least over part of the length of the power-unit crossmember.

The provision of the rigid supporting profiles and the fact that these are secured on the power-unit crossmember in a force-transmitting manner means that forces which are exerted on the power-unit crossmember as a result of impact loading in the transverse direction of the vehicle no longer act exclusively on the fastening points, but rather are transmitted into the floor structure by virtue of the surface abutment of the supporting profiles against the respective lateral tunnel wall, this surface abutment taking place even if the floor structure is merely deformed to a small extent. This reliably prevents rupturing of the power-unit crossmember in the region of the fastening points. In addition, the supporting profiles also stiffen the tunnel arrangement as a whole.

The rigid supporting profiles can be secured on the power-unit crossmember in a force-transmitting manner by any type of known fastening means, provided that this force-transmitting connection is of higher strength than the attachment of the power-unit crossmember in the region of the fastening points on corresponding sections of the floor structure relative to the tunnel arrangement. The phrase "secured in a force-transmitting manner" thus means that the method of securing the supporting profiles on the power-unit crossmember has to be considerably stronger than the method of securing the power-unit crossmember relative to the tunnel arrangement.

The arrangement of the supporting legs parallel to the corresponding tunnel wall, and at a small distance therefrom, means that the surface abutment of the supporting legs against the respective tunnel wall, and thus surface pressure, is achieved even if the floor structure is merely deformed to a small extent. The feature of the supporting leg having to extend at least over a part of the length of the power-unit crossmember concerns the extent in the longitudinal direction of the vehicle, which is also designated as the width of the power-unit crossmember. The length must thus be dimensioned such that, rather than point loading, surface loading of the tunnel wall is obtained with appropriate deformation of the floor structure. A particularly preferred embodiment according to the invention provides a supporting-leg length which corresponds to the length of the power-unit crossmember—as seen in the longitudinal direction of the vehicle.

In one configuration of the invention, a front end side and a rear end side—in relation to the longitudinal direction of the vehicle—of each supporting leg are provided with a reinforcement flange which extends in the transverse direction of the vehicle. This further increases the rigidity of each supporting leg.

In a further configuration of the invention, a stiffening rib projects at right angles from each reinforcement flange and extends over the entire length of each reinforcement flange. This further increases the inherent rigidity of each supporting profile.

Other objects, advantages and novel features of the present invention will become apparent from the following detailed description of the invention when considered in conjunction with the accompanying drawings.

DETAILED DESCRIPTION OF THE DRAWINGS

Figure 1:
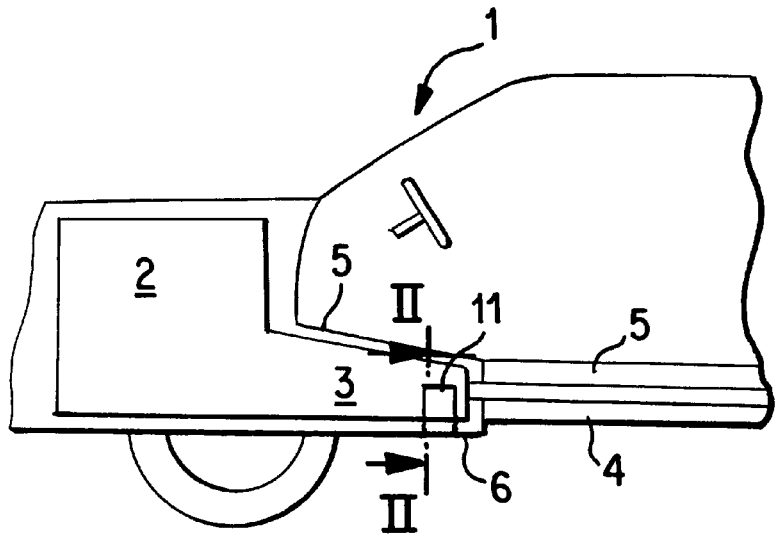
FIG. 1 shows a side view of a front half of a motor vehicle which is provided with an embodiment of a floor structure according to the invention.
Figure 2:
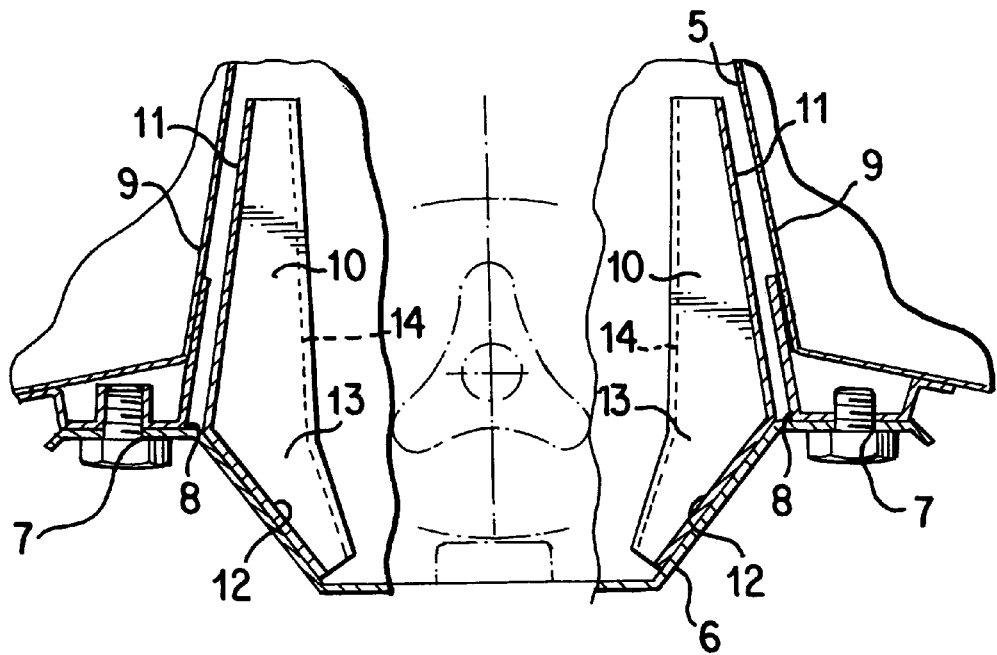
FIG. 2 shows a section through the floor structure of the motor vehicle according to FIG. 1 along the section line II—II in FIG. 1, the power-unit parts not being illustrated.
Figure 3:
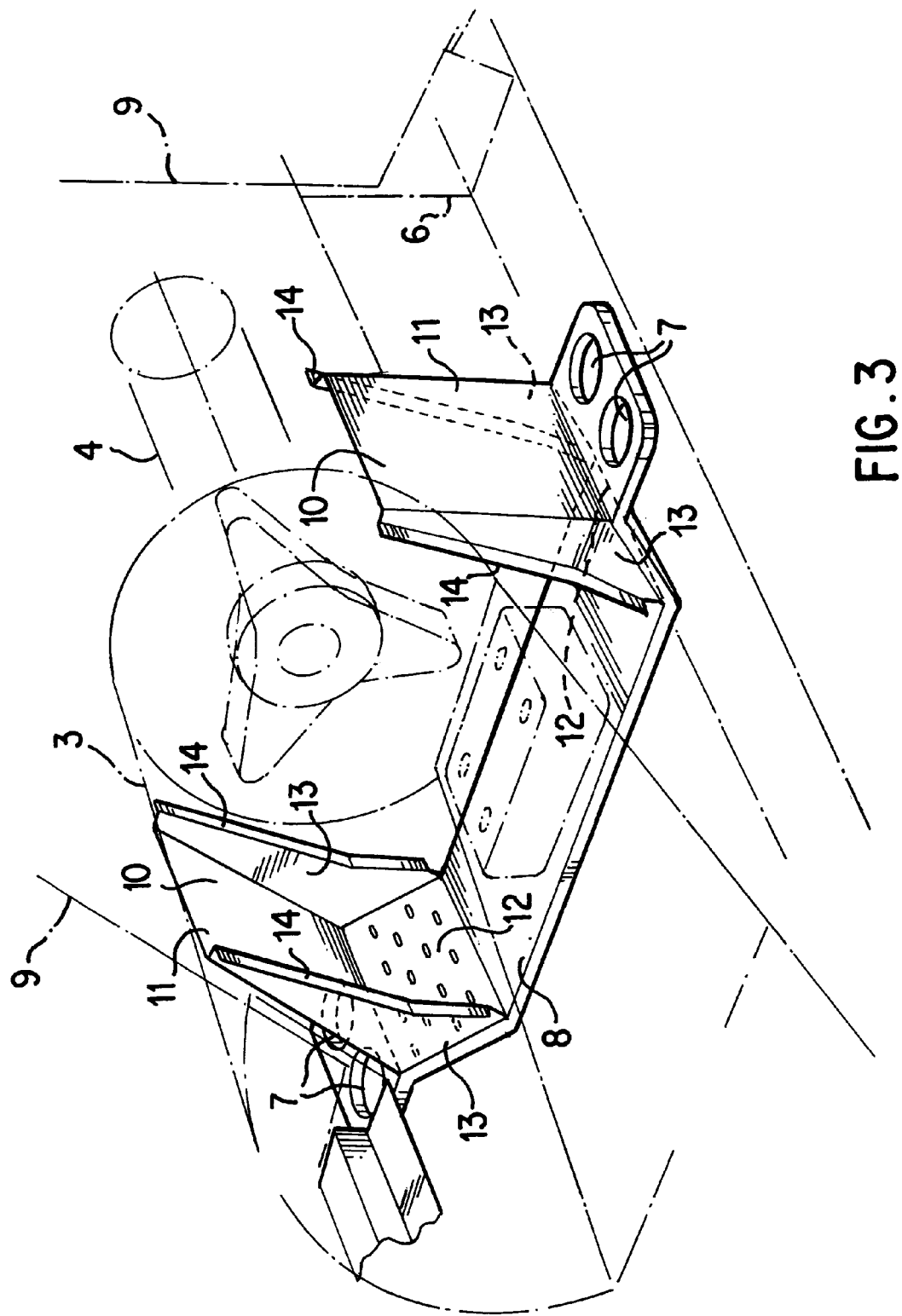
FIG. 3 shows a perspective illustration of the power-unit crossmember according to FIG. 2.

In a front region, a passenger vehicle 1 according to FIG. 1 has an engine compartment, in which there is arranged a drive unit 2 which serves as a power-unit part. This drive unit 2 is joined to the rear, in the longitudinal direction of the vehicle, by a gearbox 3, which likewise comprises power-unit parts and from which a cardan shaft 4 which serves as a power-unit part, extends rearwards in the longitudinal direction of the vehicle. For the purpose of receiving the gearbox 3 and the cardan shaft 4, a central tunnel 5 is provided, in a manner known per se, in a floor structure of a self-supporting body of the passenger vehicle 1, and this tunnel is curved out convexly in a duct-like manner into the vehicle interior and, in the longitudinal direction of the vehicle, extends over the entire length of a passenger compartment of the vehicle body. The central tunnel 5 has two mutually opposite side walls 9, which extend in the longitudinal direction of the vehicle. The central tunnel 5 is open towards the underside of the floor structure, and thus towards the underside of the passenger vehicle 1.

Secured from beneath on the floor structure, level with the gearbox 3, is a gearbox crossmember 6, which serves as power-unit crossmember and supports the gearbox 3 from beneath. The gearbox crossmember 6 is configured as a load-bearing part and extends, transversely with respect to the longitudinal direction of the vehicle, over the width of the central tunnel 5. The gearbox crossmember 6 has a V-like profile and, by means of lateral fastening flanges, is secured on reinforcement panels 8 on both sides of the central tunnel 5 by a plurality of screwed connections. The reinforcement panels 8 are of box-like configuration and are welded to the respectively corresponding lateral tunnel wall 9 and, towards the outside, to an underside of the floor structure. In the exemplary embodiment illustrated, the gearbox crossmember 6 is secured on each side, with the aid of two fastening points, on the respective reinforcement panel 8, and thus also on the floor structure and on the tunnel wall 9, via screwed connections 7.

In order to prevent rupturing of the gearbox crossmember 6 in the region of the points of fastening to the floor structure, in the case of forces which occur in the transverse direction of the vehicle as a result of lateral impact loading on the passenger vehicle 1, one supporting profile 10 is provided on each side of the gearbox crossmember 6, in each case assigned to one of the two tunnel walls 9. The two supporting profiles 10 are secured on the gearbox crossmember 6 in a mirror-symmetrical manner with respect to one another and are each configured as an angle profile. As far as its extent in the longitudinal direction of the vehicle is concerned, each supporting profile 10 corresponds to the extent of the gearbox crossmember 6 in the longitudinal direction of the vehicle.

Each supporting profile 10 has a bearing leg 12, which, over its entire surface, bears on an associated, sloping and planar fixing surface of the gearbox crossmember 6 and is surface-connected to the gearbox crossmember 6 by spot welding. Projecting freely upwards from each bearing leg 12 is a supporting leg 11, which, in the installed state of the gearbox crossmember 6, extends parallel to the adjacent tunnel wall 9, at a small distance therefrom, in the longitudinal direction of the vehicle.

In order for the supporting leg 11 of each supporting profile 10 to have high rigidity, the front end side and rear end side—as seen in the longitudinal direction of the vehicle—of each supporting profile 10 are provided with a reinforcement flange 13, which each extend, transversely with respect to the longitudinal direction of the vehicle, over the entire height of each supporting profile 10. In order to increase the inherent rigidity of each supporting profile 10 further, it is also the case that each reinforcement flange 13 is assigned a stiffening rib 14 which projects outwards, i.e. forwards or rearwards, from the supporting profile 10 in the longitudinal direction of the vehicle, projects at right angles, in the longitudinal direction of the vehicle, from an inner border of each reinforcement flange, and runs over the entire height of each reinforcement flange 13. Each supporting profile 10 is configured as a single-piece component and is produced either from sheet steel or as an aluminum component.

The connection of each supporting profile 10, in the region of its bearing leg 12, to the gearbox crossmember 6 is stable to such an extent that, in the event of impact loading in the transverse direction of the vehicle, forces which occur in the floor structure are passed on between the tunnel walls 9 and the supporting legs 11 of each supporting profile 10, this relieving the load from the screwed connections 7 in the region of the fastening points. Rupturing of the gearbox crossmember 6 in the event of such impact loading can therefore be reliably prevented. In addition, the supporting profiles 10 serve for increasing the rigidity of the central tunnel 5, and thus also for increasing the rigidity of the floor structure as a whole.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Floor structure for a self-supporting motor-vehicle body, comprising:

a tunnel arrangement which is open to one side, said tunnel arrangements extends in a longitudinal direction of the motor-vehicle body and is intended for receiving individual power-unit parts, and a power-unit crossmember which supports said individual power-unit parts, said power-unit crossmember extends transversely over the open side of the tunnel arrangement and is secured relative to the tunnel arrangement with a plurality of fastners, wherein two mutually opposite supporting profiles are secured on the power-unit crossmember by a connection which is of higher strength than that of said fasteners, each supporting profile having a free standing dimensionally rigid supporting leg which extends in parallel to and along a lateral tunnel wall of the tunnel arrangement at a small distance therefrom along a length thereof, wherein said support leg has an upper end free of attachment from said tunnel wall, said supporting legs extending at least over part of a length of the power-unit crossmember in relation to the longitudinal direction of the motor-vehicle body.

2. Floor structure according to claim 1, wherein a front end side and a rear end side of each supporting profile in relation to the longitudinal direction of the motor-vehicle body are each provided with a reinforcement flange which extends in a transverse direction of the motor-vehicle body.

3. Floor structure according to claim 2, wherein a stiffening rib projects at right angles from each reinforcement flange and extends over an entire length of each reinforcement flange.

4. Floor structure according to claim 1, wherein said connection use welds.

5. Floor structure according to claim 1, wherein the supporting profiles are produced from one of aluminum and steel.

6. A method of making a floor structure for a self-supporting motor-vehicle body, comprising:

providing a tunnel arrangement which is open to one side, said tunnel arrangement extends in a longitudinal direction of the motor-vehicle body and is intended for receiving individual vehicle power-unit parts, and providing a power-unit crossmember which in use supports said individual power-unit parts, said power-unit crossmember extends transversely over the open side of the tunnel arrangement and is secured relative to the tunnel arrangement with a plurality of fasteners, and securing two mutually opposite supporting profiles on the power-unit crossmember by a connection which is of higher strength than that of said fasteners, each supporting profile having a free standing dimensionally rigid supporting leg which extends in parallel to and along a lateral tunnel wall of the tunnel arrangement at a small distance therefrom along a length thereof, wherein said support leg has an upper end free of attachment from said tunnel wall, said supporting legs extending at least over part of a length of the power-unit crossmember in relation to the longitudinal direction of the motor-vehicle body.

7. A method according to claim 6, wherein a front end side and a rear end side of each supporting profile in relation to the longitudinal direction of the motor-vehicle body are each provided with a reinforcement flange which extends in a transverse direction of the motor-vehicle body.

8. A method according to claim 7, wherein a stiffening rib projects at right angles from each reinforcement flange and extends over an entire length of each reinforcement flange.

9. A method according to claim 6, wherein said connection use welds.

10. A method according to claim 6, wherein the supporting profiles are produced from one of aluminum and steel.

11. A method according to claim 6, wherein the connection of the supporting profiles on the power unit crossmember comprises a joining along facing flat surfaces of said cross member and supporting profiles.

12. A method according to claim 11, wherein said connection use welds.

* * * * *